US007764401B2

(12) United States Patent
Miyata

(10) Patent No.: US 7,764,401 B2
(45) Date of Patent: Jul. 27, 2010

(54) IMAGE FORMING APPARATUS AND PROGRAM PRODUCT WITH PLURAL SETTING MODES AND A CONDITIONALLY DISPLAYED SCREEN FOR ADJUSTING COLOR CONVERSION

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 571 days.

(21) Appl. No.: 11/752,324

(22) Filed: May 23, 2007

(65) Prior Publication Data

US 2007/0273942 A1 Nov. 29, 2007

(30) Foreign Application Priority Data

May 23, 2006 (JP) ............................. 2006-142666

(51) Int. Cl.
*H04N 1/60* (2006.01)
*H04N 1/50* (2006.01)

(52) U.S. Cl. ....................... 358/1.9; 358/1.13; 358/518; 358/523; 358/527

(58) Field of Classification Search .................. 358/1.9, 358/2.1, 1.13, 518, 527, 523
See application file for complete search history.

(56) References Cited

U.S. PATENT DOCUMENTS 5,726,779 A * 3/1998 Kadowaki et al. ........... 358/520
5,889,929 A 3/1999 Hori et al.
7,174,110 B2 * 2/2007 Soga et al. .................... 399/27
7,508,552 B2 * 3/2009 Touura ....................... 358/1.9
2002/0030838 A1 * 3/2002 Toyama et al. ............. 358/1.13
2005/0286100 A1 * 12/2005 Uotani et al. ............... 358/527

FOREIGN PATENT DOCUMENTS

JP 6291997 10/1994
JP 9-307763 A 11/1997
JP 11032226 2/1999
JP 2000217007 8/2000
JP 2004-34362 A 2/2004
JP 2005060041 3/2005
JP 2005267044 9/2005
JP 2005267485 9/2005

OTHER PUBLICATIONS

JP Office Action dtd Aug. 19, 2008, JP Appln. 2006-142666.

* cited by examiner

*Primary Examiner*—Scott A Rogers
(74) *Attorney, Agent, or Firm*—Banner & Witcoff, Ltd.

(57) ABSTRACT

An image forming apparatus includes an image data correcting unit, an image forming unit, a setting designation unit, a color conversion information storing unit and an adjusting screen displaying unit. The image data correcting unit is configured to correct image data based on color conversion information. The image forming unit forms an image corresponding to the corrected image data on a recording medium. The setting designating unit is configured to designate one of a plurality of the setting modes contained in setting information to form the image. The color conversion information storing unit stores the color conversion information for each of the setting modes. The adjusting screen displaying unit is configured to display an adjusting screen on a display screen, which is used for adjusting the color conversion information applied to form the image, if the color conversion information corresponding to the designated setting mode is in a predetermined condition.

15 Claims, 8 Drawing Sheets

| COLOR MODE | IMAGE QUALITY MODE | MEDIA TYPE | COLOR ADJUSTED FLAG | COLOR ADJUST TIME | COLOR ADJUSTING MODE | ADJUSTING INTERVAL |
|---|---|---|---|---|---|---|
| COLOR | PHOTO MODE | HIGH-QUALITY PAPER | TRUTH | 2006/04/21 17:30:00 | FORCED ON | |
| | | REGULAR PAPER | FALSE | ... | ... | |
| | GRAPH MODE | HIGH-QUALITY PAPER | FALSE | ... | ... | |
| | | REGULAR PAPER | TRUTH | 2006/02/10 10:00:00 | AS NEEDED | EVERY 30 DAY |
| MONOCHROMATIC | PHOTO MODE | HIGH-QUALITY PAPER | FALSE | ... | ... | |
| | | REGULAR PAPER | FALSE | ... | ... | |
| | GRAPH MODE | HIGH-QUALITY PAPER | FALSE | ... | ... | |
| | | REGULAR PAPER | FALSE | ... | ... | |

*FIG. 7*

| COLOR MODE | IMAGE QUALITY MODE | MEDIA TYPE | COLOR ADJUSTED FLAG | COLOR ADJUST TIME | COLOR ADJUSTING MODE | ADJUSTING INTERVAL |
|---|---|---|---|---|---|---|
| COLOR | PHOTO MODE | HIGH-QUALITY PAPER | TRUTH | 2006/04/21 17:30:00 | FORCED ON | |
| | | REGULAR PAPER | FALSE | . . . | . . . | |
| | GRAPH MODE | HIGH-QUALITY PAPER | FALSE | . . . | . . . | |
| | | REGULAR PAPER | TRUTH | 2006/02/10 10:00:00 | AS NEEDED | EVERY 30 DAY |
| MONOCHROMATIC | PHOTO MODE | HIGH-QUALITY PAPER | FALSE | . . . | . . . | |
| | | REGULAR PAPER | FALSE | . . . | . . . | |
| | GRAPH MODE | HIGH-QUALITY PAPER | FALSE | . . . | . . . | |
| | | REGULAR PAPER | FALSE | . . . | . . . | |

| COLOR MODE | IMAGE QUALITY MODE | MEDIA TYPE | COLOR | BRIGHT-NESS | RED | GREEN | BLUE |
|---|---|---|---|---|---|---|---|
| COLOR | PHOTO MODE | HIGH-QUALITY PAPER | 1 | 0 | 0 | -2 | 0 |
| | | REGULAR PAPER | 0 | 0 | 0 | 0 | 0 |
| | GRAPH MODE | HIGH-QUALITY PAPER | 0 | 0 | 0 | 0 | 0 |
| | | REGULAR PAPER | -2 | -2 | 0 | 0 | 0 |
| MONO-CHRO-MATIC | PHOTO MODE | HIGH-QUALITY PAPER | 0 | 0 | 0 | 0 | 0 |
| | | REGULAR PAPER | 0 | 0 | 0 | 0 | 0 |
| | GRAPH MODE | HIGH-QUALITY PAPER | 0 | 0 | 0 | 0 | 0 |
| | | REGULAR PAPER | 0 | 0 | 0 | 0 | 0 |

IMAGE FORMING APPARATUS AND PROGRAM PRODUCT WITH PLURAL SETTING MODES AND A CONDITIONALLY DISPLAYED SCREEN FOR ADJUSTING COLOR CONVERSION

CROSS-REFERENCE TO RELATED APPLICATIONS

This application is based upon and claims the benefit of priority from Japanese Patent Application No. 2006-142666, filed on May 23, 2006, the entire contents of which are incorporated herein by reference.

TECHNICAL FIELD

The present invention relates to an image forming apparatus for forming an image corresponding to image data on a recording medium and, more particularly, an image forming apparatus for performing an image formation after correcting image data based on color conversion information, a host apparatus for controlling the image forming apparatus and a computer readable medium for operating the image forming apparatus.

BACKGROUND

There is an image forming apparatus including an image data correcting unit for correcting image data based on color conversion information, and an image forming unit for forming an image corresponding to the corrected image data on a recording medium has been provided. In this image forming apparatus, the image data correcting unit corrects the image data based on the color conversion information, and then the image forming unit forms the image corresponding to the corrected image data on the recording medium. Therefore, the image can be formed in a user's favorite color tone by giving appropriately the color conversion information such as color, brightness, and the like.

In order to adjust the color conversion information as the user likes, a previewing function may be used. However, there may occur a difference between the image displayed by the previewing function and the image formed actually on the recording medium. Therefore, the user often repeats adjustment of the color conversion information by forming the image on the recording medium while adjusting the color conversion information until a desired image is formed.

Also, various improvements have been made to the user interface (abbreviated as "UI" hereinafter) used to adjust the color conversion information. For example, JP-A-2005-267485 discloses UI displayed automatically every time predetermined number of times of the image formation have been performed The color conversion information must be individually adjusted for each setting such as media type, resolution, etc. For example, the color conversion information suited to the "regular paper" cannot always be applied to the "high-quality paper" as it is.

However, the color conversion information has smaller chance to be changed than other settings such as media type, resolution, etc. Therefore, an UI for adjusting the color conversion information is often arranged in a position at which the UI is hard to open. JP-A-2005-267485 discloses the UI for adjusting the color conversion information is displayed automatically every time predetermined number of times of the image formation has been performed. However, this timing does not always agree with a timing of change of the settings. As a result, when a new type of paper is used, for example, the user must open the color conversion information adjusting UI each time.

SUMMARY

According to a first aspect of the invention, there is provided an image forming apparatus including: an image data correcting unit configured to correct image data based on color conversion information; an image forming unit that forms an image corresponding to the corrected image data on a recording medium; a setting designating unit configured to designate one of a plurality of the setting modes contained in setting information to form the image; a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition.

According to a second aspect of the invention, there is provided a host apparatus connectable to communicate with an image forming apparatus that includes an image forming unit that forms an image on a recording medium, the host apparatus including: an image data correcting unit configured to correct image data based on color conversion information to allow the image forming unit to form an image corresponding to the corrected image data; a setting designating unit configured to designate one of a plurality of the setting modes contained in setting information to form the image; a color conversion information storing unit that stores the color conversion information for each of the setting modes; an adjusting screen displaying unit configured to display an adjusting screen on a display screen, which is used for adjusting the color conversion information applied to form the image, if the color conversion information corresponding to the designated setting mode is in a predetermined condition.

According to a third aspect of the invention, there is provided a computer readable medium storing a software program to control an image forming apparatus that includes an image forming unit that forms an image on a recording medium, the software program enabling a computer to function as: an image data correcting unit configured to correct image data based on color conversion information to allow the image forming unit to form an image corresponding to the corrected image data; a setting designating unit configured to designate one of a plurality of the setting modes contained in setting information to form the image; a color conversion information storing unit that stores the color conversion information for each of the setting modes; an adjusting screen displaying unit configured to display an adjusting screen on a display screen, which is used for adjusting the color conversion information applied to form the image, if the color conversion information corresponding to the designated setting mode is in a predetermined condition.

BRIEF DESCRIPTION OF THE DRAWINGS

FIG. 7 is an explanatory view showing an example of a flag table used in the above processes;

DESCRIPTION

Figure 1:
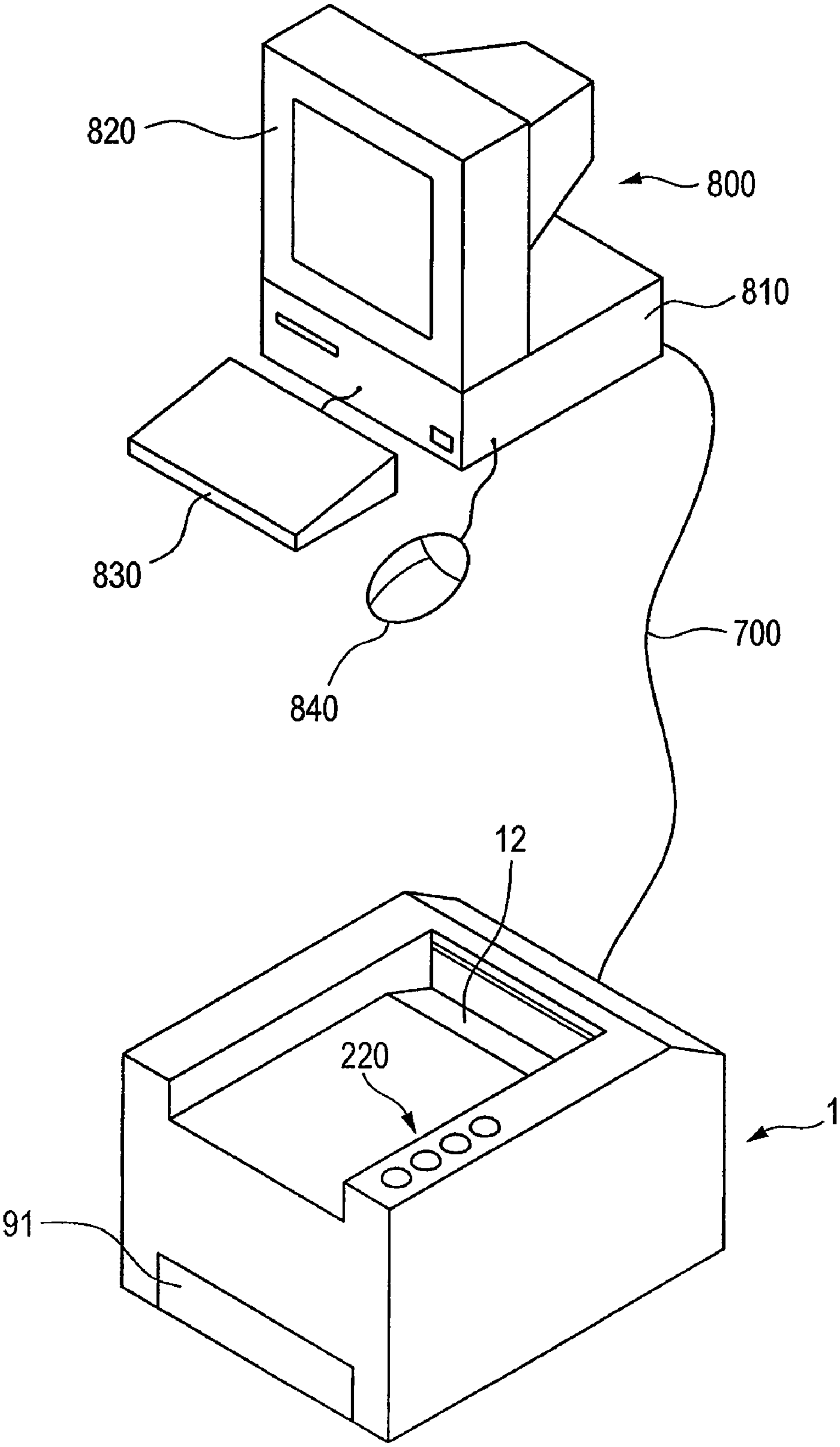
FIG. 1 is an external appearance view showing a color laser printer and a personal computer according to an embodiment of the invention.

An embodiment of the present invention will be explained with reference to the drawings hereinafter. FIG. 1 is an external appearance view showing a configuration of an image forming apparatus according to the embodiment. As shown in FIG. 1, the image forming apparatus includes: a color laser printer (referred simply to as a "printer" hereinafter) 1 as a main unit of the image forming apparatus; and a personal computer (abbreviated as a "PC" hereinafter) 800 as a host apparatus connected to the printer 1 via a cable 700. In this case, the printer 1 and the PC 800 may be connected mutually via the network such as LAN, etc.

Figure 2:
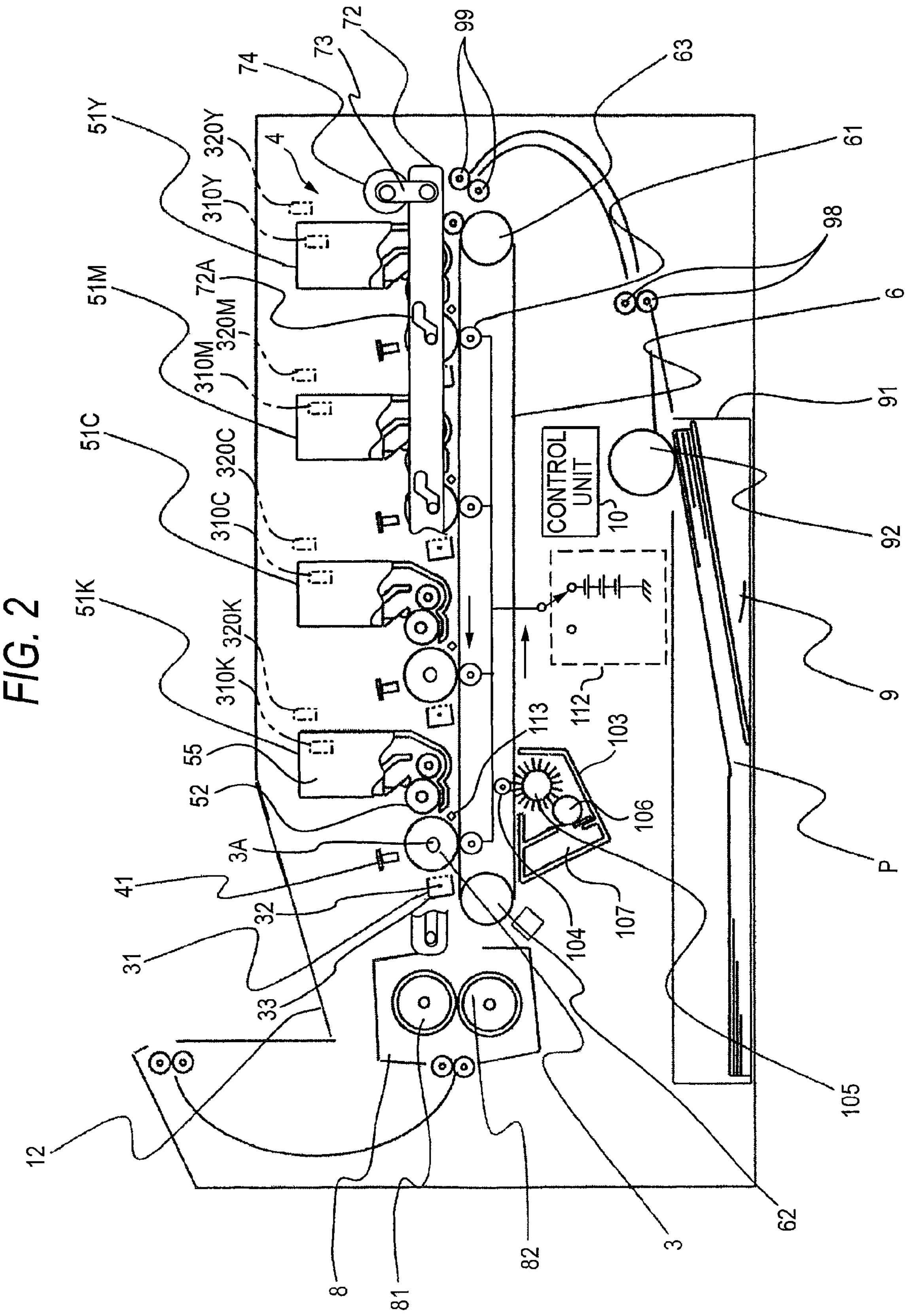
FIG. 2 is a schematic sectional view showing an internal configuration of the color laser printer.

FIG. 2 is a schematic sectional view showing an internal configuration of the printer 1. The printer 1 shown in FIG. 2 includes a toner image forming unit 4, a paper conveying belt 6, a fixing unit 8, a paper feeding unit 9, a stacker 12, and a control unit 10. The printer 1 forms four-color image on a paper P as the recording medium in response to image data being input from an external device.

Also, the toner image forming unit 4 includes four developing units 51Y, 51M, 51C, 51K. The toner image forming unit 4 further includes: a photosensitive drum 3 as an image bearing body; a charger 31 that uniformly charges the photosensitive drum 3; and a scanner unit 41 that irradiates a laser beam to form an electrostatic latent image corresponding to image data. The photosensitive drum 3, charger 31 and the scanner unit 41 are provided for each of four toner image forming steps using yellow, magenta, cyan and black toners stored in the developing units 51Y, 51M, 51C, 51K. FIG. 2 shows the scanner unit 41 at a portion from which the laser beam is finally emitted, and the rest portions thereof are omitted.

In the following explanation, a suffix of Y (yellow), M (magenta), C (cyan) or K (black) is appended to a reference symbol of the respective element when the respective element must be discriminated every color, and a suffix is omitted when there is no need to discriminate them.

The photosensitive drum 3 of the toner image forming unit 4 has an almost cylindrical member, and four photosensitive drums 3 are arranged rotatably such that they are aligned at an almost equal interval in the horizontal direction. As the almost cylindrical member of the photosensitive drum 3, for example, the member having a positive-charged photosensitive layer formed on an aluminum base material is used. The aluminum base material is grounded to a ground line of the printer 1.

The charger 31 is the so-called scorotron charger. The charger 31 includes: a charging wire 32 extending in a width direction of the photosensitive drum 3 and opposing the photosensitive drum; and a shielding case 33 that holds the charging wire 32 therein and has an opening at a side directed to the photosensitive drum 3. Then, a surface of the photosensitive drum 3 is charged in a positive polarity (e.g., +700 V) when a high voltage is applied to the charging wire 32. The shielding case 33 includes a grid provided at the opening on the side of the photosensitive drum 3. Then, a surface of the photosensitive drum 3 is charged at almost the same potential as a grid voltage when a normal voltage is applied to this grid.

The scanner unit 41 is provided to the photosensitive drum 3 on the downstream side of the charger 31 in the rotating direction of the photosensitive drum 3. The scanner unit 41 emits a laser beam, which corresponds to the image data in each color being input from the external device, from a light source and irradiates the laser beam onto the surface of the photosensitive drum 3 while scanning the laser beam by a mirror face of a polygon mirror that is rotated/driven by a polygon motor or the like.

When the laser beam corresponding to the image data is irradiated onto the surface of the photosensitive drum 3 by the scanner unit 41, a surface potential of the irradiated portion is lowered (+150 to +200 V). Thus, an electrostatic latent image is formed on the surface of the photosensitive drum 3.

Each of the developing units 51Y, 51M, 51C, 51K includes a developing unit case 55 that stores the toner of respective color; and a developing roller 52 provided in the developing unit case 55. The developing roller 52 is arranged to contact the photosensitive drum 3 on the downstream side of the scanner unit 41 in the rotating direction of the photosensitive drum 3. The developing unit 51 charges the toner at a positive polarity (+) and supplies the charged toner to the photosensitive drum 3 as a uniform thin layer to allow the electrostatic latent image formed on the photosensitive drum 3 at a positive polarity (+) to bear the toner charged at the positive polarity (+) by means of the reversal development system at the contact portion between the developing roller 52 and the photosensitive drum 3. Accordingly, the electrostatic latent image is developed.

The developing roller 52 has a cylindrical shape and includes a conductive silicon rubber or the like as a base material, and a coating layer made of a resin containing fluorine or rubber material is formed on a surface on the developing roller 52. The toner contained in the developing unit case 55 is a nonmagnetic one-component toner to be charged positively, and the yellow, magenta, cyan and black toners are accumulated in the developing units 51Y, 51M, 51C, 51K respectively.

Also, the paper feeding unit 9 is provided to the lowest portion of the apparatus and includes a sheet tray 91 for storing the paper P and a pickup roller 92 for feeding the paper P. Also, the paper P stored in the sheet tray 91 is picked up one by one from the paper feeding unit 9 by the pickup roller 92 and fed to the paper conveying belt 6 via a conveying roller 98 and a registration roller 99.

The paper conveying belt 6 is narrower in width than the photosensitive drum 3 and includes an endless belt that moves together with the paper P to convey the paper P on an upper surface. Also, the paper conveying belt 6 is stretched between a driving roller 62 and a driven roller 63. Transferring rollers 61 are respectively provided in a vicinity of the photosensitive drums 3 at a position opposing to the photosensitive drums 3 across the paper conveying belt 6. A surface of the paper conveying belt 6 on the opposing to the photosensitive drum 3 moves from the right side to the left side in FIG. 2 in response to the rotation of the driving roller 62, which conveys the paper P fed from the registration roller 99 to the fixing unit 8 to pass through photosensitive drums 3 sequentially. A cleaning unit 103 is provided to contact with a surface of the paper conveying belt 6 immediately after the belt is turned back by the driving roller 62.

The transferring roller 61 is connected to a current source 112 set to a negative voltage to apply a transfer bias (e.g., −10 to −15 μA) having an opposite polarity to the charged polarity of the toner to a clearance between the transferring roller 61 and the photosensitive drum 3. The transfer bias allows the toner image formed on the photosensitive drum 3 to be transferred onto the paper P conveyed by the paper conveying belt 6. FIG. 2 shows the current source 112 capable of selecting the transfer bias from two kinds of voltages of 0 V and a constant voltage for the sake of convenience, but actually the current source 112 may control voltage at further multiple stages. A toner amount sensor 113 for sensing an amount of toner on the surface of the photosensitive drum 3 is provided between the developing roller 52 and the transferring roller 61.

The cleaning unit 103 includes a cleaning brush 105, a waste toner remover 106 and an accumulating box 107. The cleaning brush 105 includes a brush provided around an almost cylindrical member that extends in the width direction of the paper conveying belt 6, which is arranged to be rotated while contacting with the paper conveying belt 6 in a situation that a predetermined potential difference is applied between an electrode roller 104 that is provided at a position opposing to the cleaning brush 105 via the paper conveying belt 6. The waste toner remover 106 removes the toner attached to the cleaning brush 105. The accumulating box 107 accumulates the toner removed from the cleaning brush 105.

The fixing unit 8 includes a heating roller 81 and a pressing roller 82. The fixing unit 8 fixes the toner image onto the paper P by heating and pressing the paper P with the toner image transferred thereon, while holding and conveying the paper P between the heating roller 81 and the pressing roller 82.

The stacker 12 is formed on a top surface of the printer 1. This stacker 12 is provided on the paper discharging side of the fixing unit 8 and receives the paper P discharged from the fixing unit 8. The control unit 10 includes a microcomputer using a CPU 10A (see FIG. 3) and controls the overall operation of the printer 1.

Four photosensitive drums 3 are held so that all photosensitive drums 3 can be moved away from the paper conveying belt 6 in the upward direction, and the photosensitive drums 3 are positioned by a moving member 72 that is provided to extend over four photosensitive drums 3. The moving member 72 is formed of a plate member having a length that extends over four photosensitive drums 3 and is held to move in the lateral direction in FIG. 2. Four guiding holes 72A shaped into an almost crank shape extending in the lateral direction are provided in the moving member 72, and four shafts 3A respectively provided on the side surfaces of the photosensitive drums 3 in the longitudinal direction is fitted into the guiding holes 72A, respectively.

Also, a motor 74 is provided to affect the moving member 72 via a link 73 that changes a rotating force of the motor 42 into a lateral force, and the moving member 72 is moved in the rightward or leftward direction when the motor 74 is rotated in response to a command signal issued from the control unit 10. In this manner, when the moving member 72 is moved in the leftward direction, the guiding holes 72A are moved in the leftward direction and then the shaft 3A of each photosensitive drum 3 moves upward along the almost crank shape of the guiding hole 72A. Thus, the photosensitive drums 3 are separated away from the paper conveying belt 6. Conversely, when the moving member 72 is moved in the rightward direction, the photosensitive drums 3 are brought into contact with the paper conveying belt 6. Normally, the image formation is performed in a condition that the photosensitive drums 3 are brought into contact with the paper conveying belt 6.

An operation of forming the image on the paper P in the printer 1 will be described. First, a sheet of paper P is fed from the paper feeding unit 9 by the pickup roller 92 and conveyed to the paper conveying belt 6 via the conveying roller 98 and the registration roller 99. Then, a surface of the photosensitive drum 3Y arranged on the rightmost side in FIG. 2 is charged uniformly by the charger 31 and then exposed by the scanner unit 41 to respond to the image data for yellow being input from the external device, thereby the electrostatic latent image being formed as described above. Then, the yellow toner being charged in the developing unit 51Y at the positive polarity is supplied to the surface of the photosensitive drum 3Y, and thus the electrostatic latent image is developed. Then, the toner image formed in this manner is transferred onto the surface of the paper P, which is conveyed by the paper conveying belt 6, by the transferring roller 61 to which the transferring bias is applied.

Then, the paper P is sequentially conveyed to opposing positions to magenta, cyan and black photosensitive drums 3, the toner images are formed on the surfaces of the photosensitive drums 3 in the similar procedures to those applied to the yellow toner, and the toner images are transferred onto the paper P by the transferring rollers 61 to be superposed mutually. Finally a four-color toner image formed on the paper P is fixed onto the paper P by the fixing unit 8, and then the paper P is discharged onto the stacker 12.

Also, as indicated by a virtual line in FIG. 2, IC tags 310Y, 310M, 310C, 310K for indicating information such as a serial number of the developing unit 51 are attached to the developing unit case 55 that is removably attached to the printer 1, and IC tag readers 320Y to 320K for reading the IC tag respectively are provided on the main body side of the printer 1.

Figure 3:
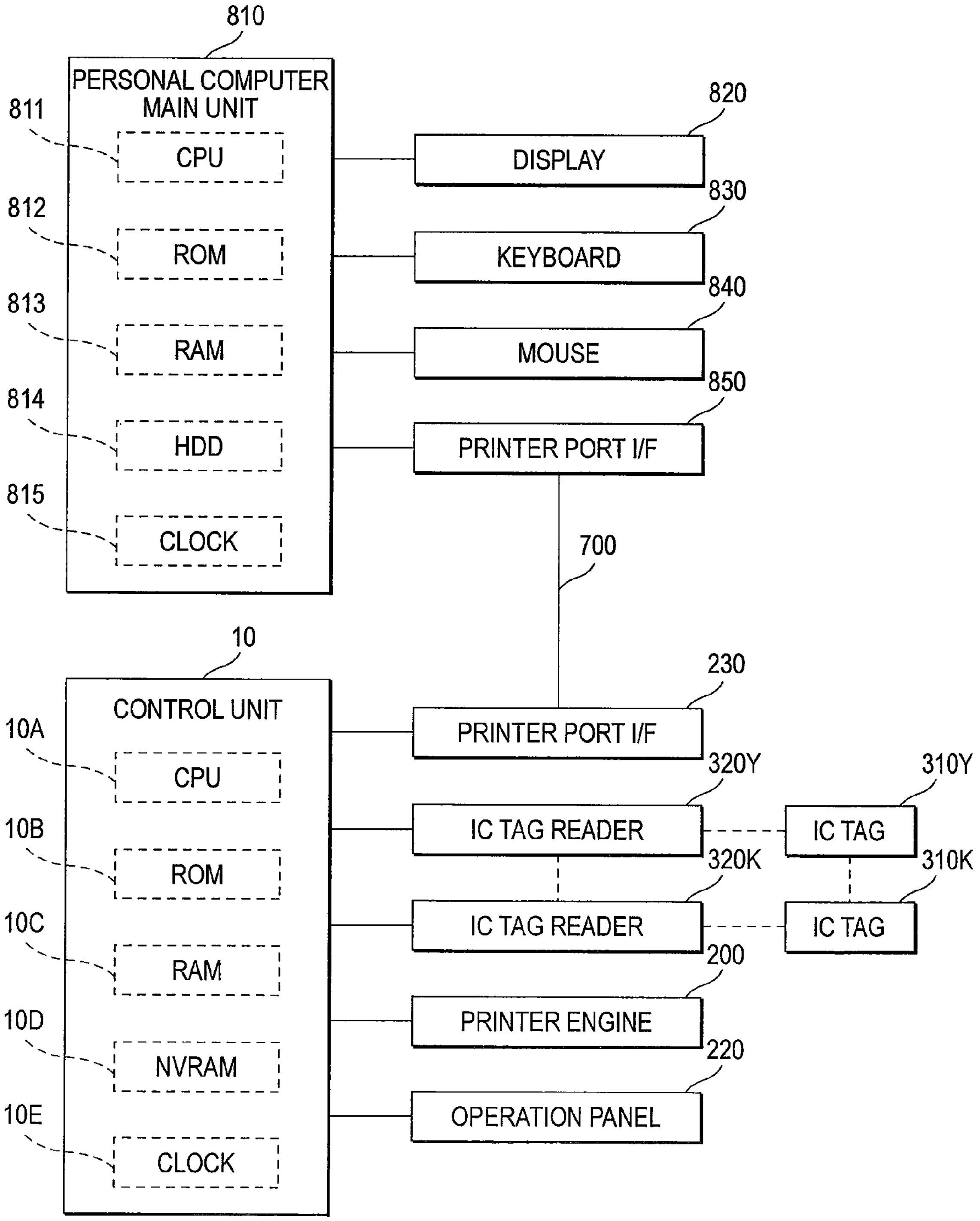
FIG. 3 is a block diagram showing a configuration of a control system of the color laser printer and the personal computer.

FIG. 3 is a block diagram showing a configuration of a control system in this embodiment. As shown in FIG. 3, a PC main unit 810 of the PC 800 includes a CPU 811, a ROM 812, a RAM 813, a hard disk drive (HDD) 814 as an example of a color conversion information storing unit and a clock 815. The PC main unit 810 is connected with: a display 820 such as a CRT; a keyboard 830; a mouse 840 (all see FIG. 1); and a printer port interface (printer port I/F) 850 connected to the printer 1.

The control unit 10 of the printer 1 includes a microcomputer containing a CPU 10A, a ROM 10B and a RAM 10C. Also, the control unit further includes: a NVRAM10D capable of retaining contents even when a power switch is turned OFF; and a clock 10E. The control unit 10 is connected with: the IC tag readers 320Y to 320K; various actuators in a elements from the paper feeding unit 9 to the fixing unit 8 as an example of the image forming unit (also referred to as a "printer engine 200" hereinafter); an operation panel 220 (see FIG. 1) provided on the surface of the printer 1; and a printer interface (printer port I/F) 230 connected to the PC 800.

Figure 4:
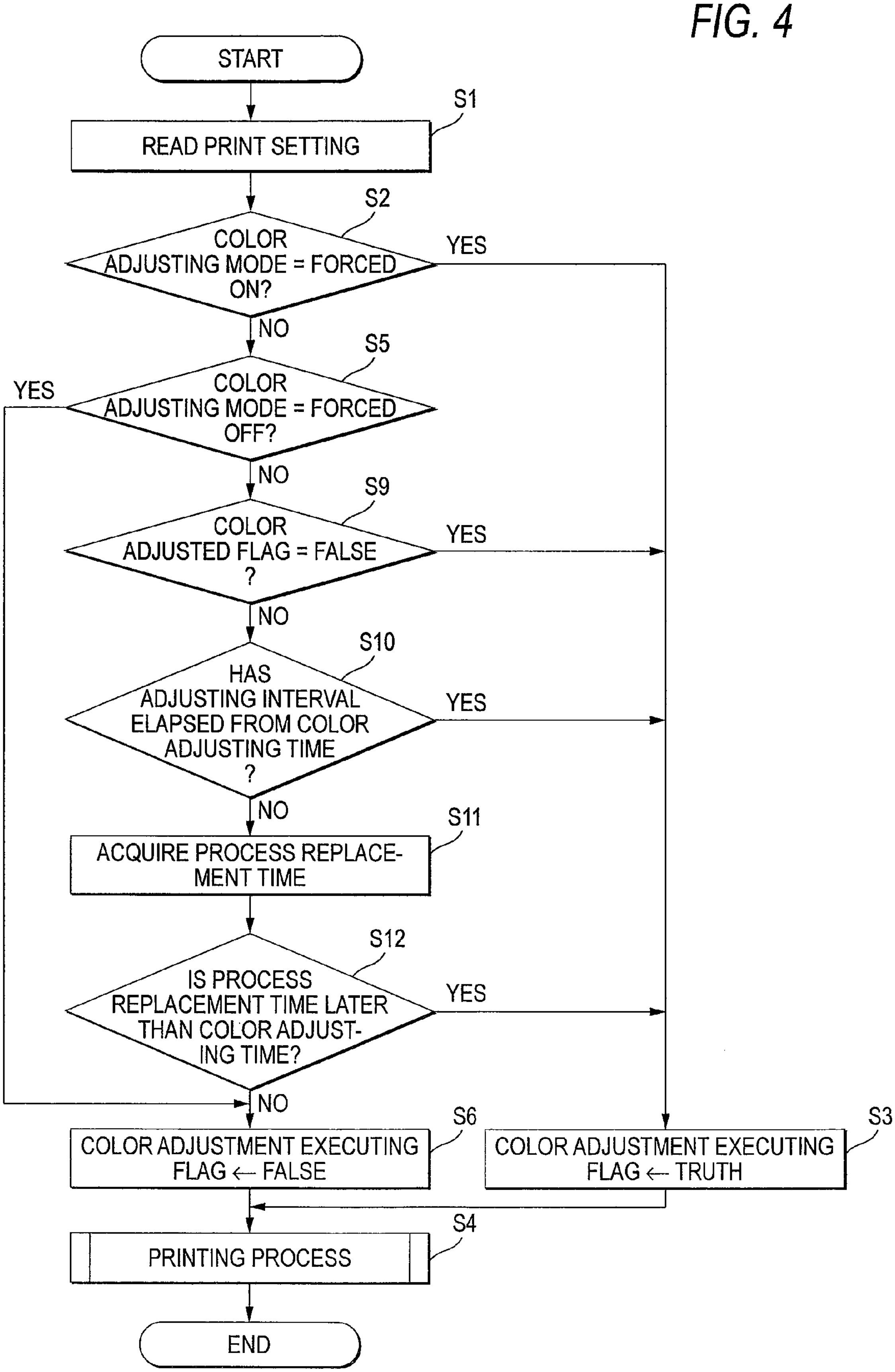
FIG. 4 is a flowchart showing a main routine of processes that the personal computer executes in printing.

Next, the process executed in this control system will be explained hereunder. FIG. 4 is a flowchart showing a main routine of a process that the CPU 811 of the PC 800 executes based on a program stored in the HDD 814 as an example of the computer readable medium when the image formation (also referred to as a "printing" hereinafter) is performed by the printer 1. Here, this process is executed when the printing is instructed in other application in the PC 800, e.g., the application such as chart formation, document formation, etc.

As shown in FIG. 4, when the process is started, at first, the print setting stored previously in the HDD 814 is read in S1 (here "S" denotes a step: the same rule applies to the following). Then, a print setting UI 910 (see FIG. 5) used to input various setting information such as a color mode, an image quality mode, a media type, etc. is displayed on the display 820 based on printing information used in the preceding printing. This S1 serves as an example of an operation of a setting designating unit.

Figure 5:
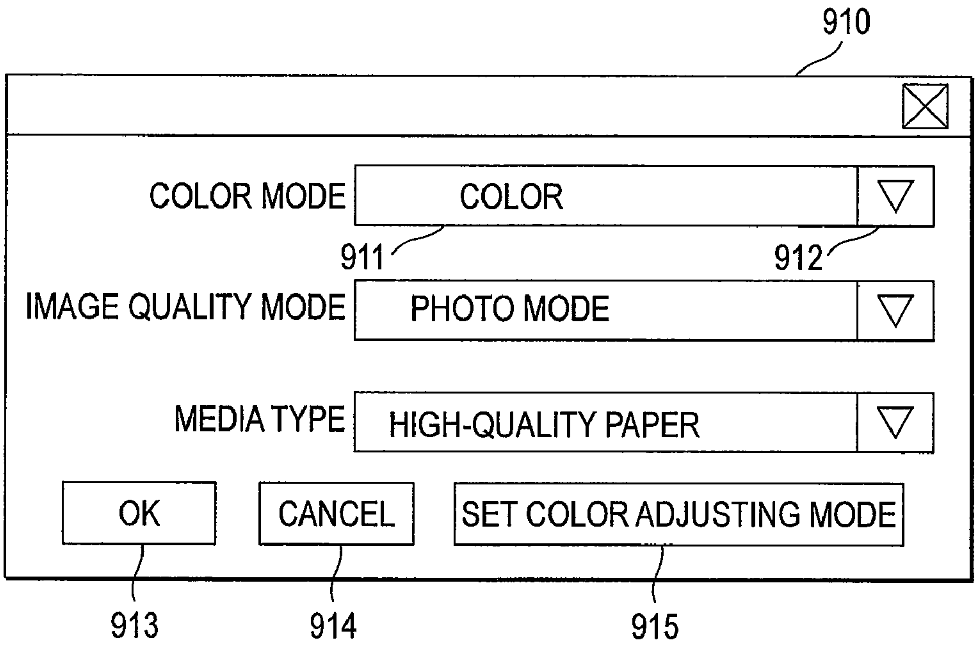
FIG. 5 is an explanatory view showing an example of a print setting UI that the personal computer displays.

As shown in FIG. 5, text input portions 911 and candidate display buttons 912 are provided for color mode, image quality mode, media type in the print setting UI 910, respectively. Also, an OK button 913, a cancel button 914 and a color adjusting mode set button 915 are provided. Normally, when the user wishes to change the setting from the printing information used in the preceding printing in the print setting UI 910, the user inputs an appropriate text into the text input portion 911 from the keyboard 830 or selects the appropriate candidate by clicking the candidate display button 912 by the mouse 840 (referred simply to as "press the candidate display button 912" hereinafter: the same rule applies to other buttons) to display the selected candidate on the text input portion 911. Then, the user presses the OK button 913 to store a changed combination in the HDD 814 (here, the default value is stored at first). Therefore, in S1, the combination of various setting information displayed on the text input portion 911 is read from the HDD 814 as printing information and is set. Also, when the cancel button 914 is pressed or when the OK button 913 is pressed without change of respective items in the print setting UI 910, the printing information used in the preceding printing is read as it is in S1.

Figure 6:
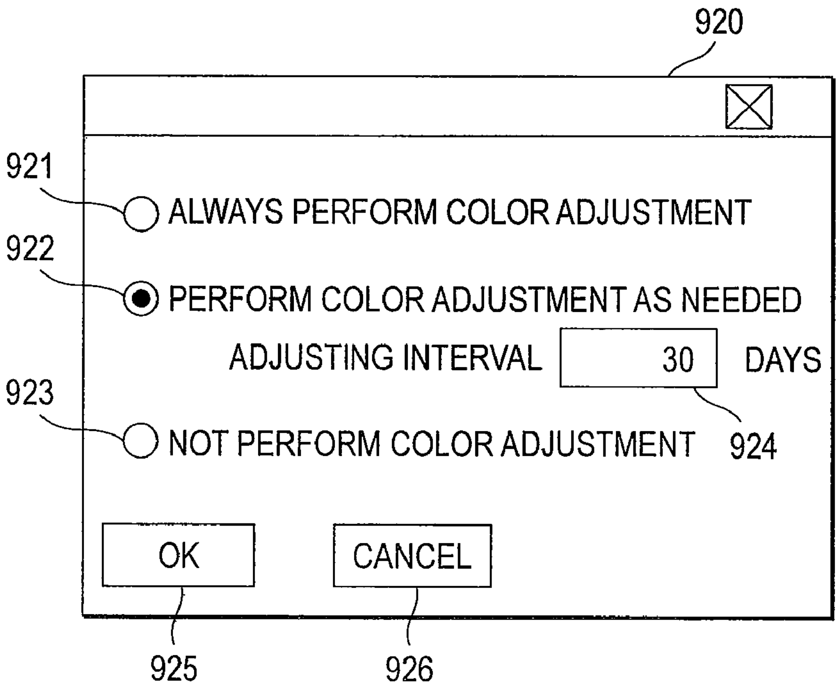
FIG. 6 is an explanatory view showing an example of a color adjusting mode setting UI that the personal computer displays.

In contrast, when the color adjusting mode setting button 915 of the print setting UI 910 is pressed, a color adjusting mode setting UI 920 shown in FIG. 6 is displayed on the display 820. Check boxes 921, 922, 923 used to select any one of color adjusting modes of "always perform color adjustment", "perform color adjustment as needed", and "not perform color adjustment" are displayed in the color adjusting mode setting UI 920. Then, when the "perform color adjustment as needed" is selected, the user can input an adjusting interval as an example of a predetermined time interval in unit of day into a text input portion 924. Also, an OK button 925 and a cancel button 926 are provided to the color adjusting mode setting UI 920. When the OK button 925 is pressed, the color adjusting mode set in the color adjusting mode setting UI 920 is stored in the HDD 814 to correlate with the print setting set in the print setting UI 910. Also, when the cancel button 926 is pressed, the color adjusting mode that correlate with the print setting is not changed. Also, when either the OK button 925 or the cancel button 926 is pressed, the color adjusting mode setting UI 920 disappears and the print setting UI 910 is displayed on the display 820.

Here, a flag table shown in FIG. 7 is stored in the HDD 814. This flag table is classified into various print settings containing a combination of color mode, image quality mode and media type. Further, a color adjusted flag, a color adjust time, a color adjusting more and an adjusting interval are stored as an example of adjusted information for each print setting. The color adjusting mode being set in the color adjusting mode setting UI 920 is written into the color adjusting mode column of the flag table, and the adjusting interval being input into the text input portion 924 is written into the color adjusting mode column only when the color adjusting mode is "perform color adjustment as needed." Here, the color adjusted flag and the color adjust time will be described in detail later.

Returning to FIG. 4, if the print setting is read as above in S1, the CPU 811 determines in S2 whether the color adjusting mode for the print setting is set to "forced ON," i.e., "always perform color adjustment," by referring to the color adjusting mode column of the flag table. If the color adjusting mode is set to "forced ON" (S2: Y), a color adjustment executing flag is set to "truth" in S3, and then the printing process is executed in S4.

Figure 8:
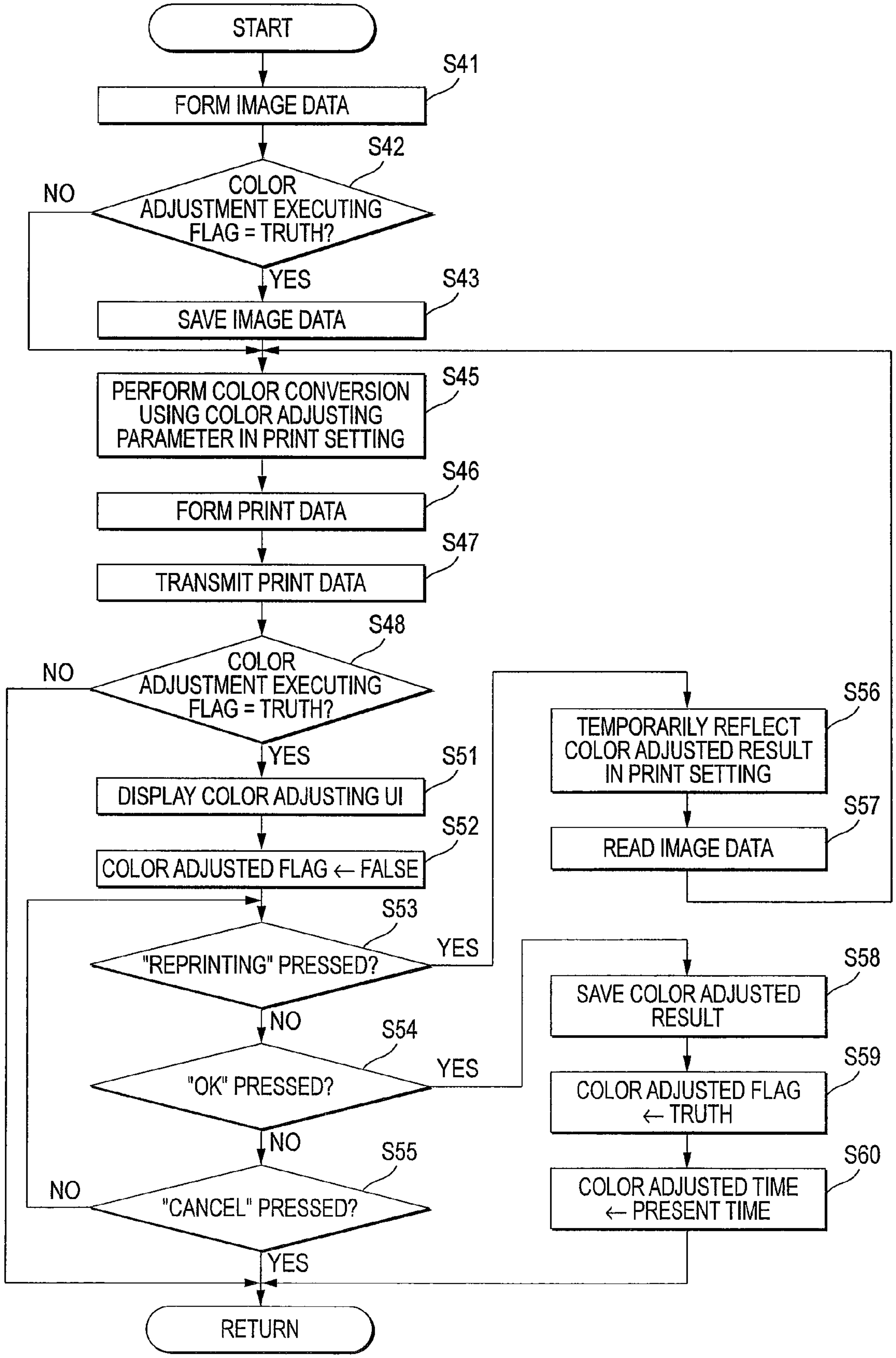
FIG. 8 is a flowchart showing a printing process in detail.

FIG. 8 is a flowchart showing in detail the printing process executed in S4. As shown in FIG. 8, at first, the image data as the source of print data is formed in S41. Specifically, the drawing process in response to the printing command issued from the foregoing application is performed to form data, such as data containing R (red), G (green), B (blue) intensities at 256 stages for each pixel. Then, in S42, the CPU 811 determines whether the color adjustment executing flag is "truth." As described above, if the color adjustment executing flag is "truth" (S42: Y), the image data are saved in a predetermined area of the RAM 813 in S43, and then the process proceeds to S45. In contrast, if the color adjustment executing flag is "false" (S42: N), the process proceeds to S45.

Figures 9, 10:
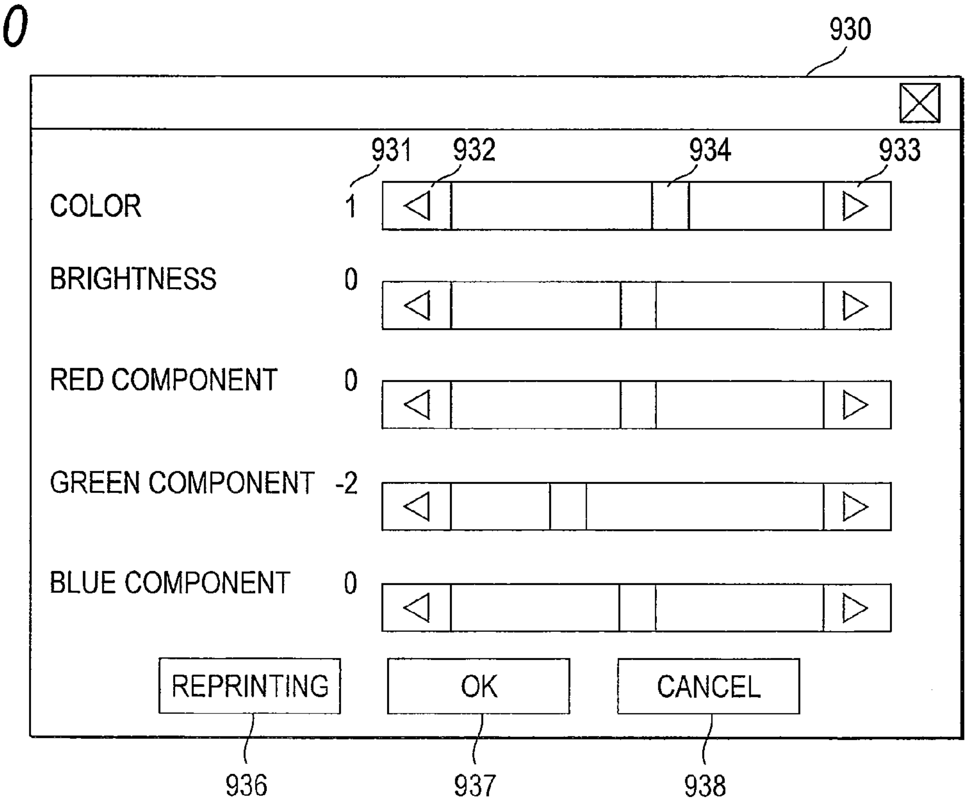
FIG. 9 is an explanatory view showing an example of a parameter table used in the above processes.
FIG. 10 is an explanatory view showing an example of a color adjusting UI that the personal computer displays.

In S45, the colors (R, G, B) of each pixel are converted using a color adjusting parameter assigned to the print setting read in S1. A parameter table shown in FIG. 9 is stored in the HDD 814. As shown in FIG. 9, the parameter table is classified into various print settings as modes each defined by a combination of setting items such as a color mode, an image quality mode and a media type. Color adjusting parameters, as an example of color conversion information for a color, brightness, a red (component), a green (component) and a blue (component), are stored for each print setting. In S45, the image data are corrected based on the color adjusting parameters stored in the parameter table, which is an example of operation of an image data correcting unit.

Then, in S46, print data used to drive the printer 1 are formed based on the corrected image data. Specifically, the following processes are performed: converting R, G, B data at 256 stages, for example, into Y, M, C, K multi-valued data; executing the compressing process, etc; and then converting the data into data that the control unit 10 of the printer 1 is readable. Then, in S47, the print data formed in S46 are transmitted to the control unit 10 of the printer 1 via the cable 700. At that time, the control unit 10 forms the image on the paper P by driving the printer engine 200 based on the print data. In this case, the conversion from the image data to the print data may be performed on the printer 1 instead of PC 800.

Then, in S48, the CPU 811 determines whether the color adjustment executing flag is "truth". If the color adjustment executing flag is "false" (S48: N), the process is ended. In contrast, if the color adjustment executing flag is "truth" (S48: Y), a color adjusting UI 930 as an example of an adjust screen shown in FIG. 10 is displayed on the display 820 in S51. This S51 serves as an example of an operation of an adjust screen displaying unit.

As shown in FIG. 10, the color adjusting UI 930 includes: a numerical value display portion 931 for displaying the color adjusting parameter as a numerical value; a button 932 for decrementing the numerical value by one; a button 933 for incrementing the numerical value by one; and a button 934 for changing the numerical value by dragging and moving the mouse 840, which are provided with respect to each of color, brightness, red component, green component and blue component. Also, a reprinting button 936, an OK button 937 and a cancel button 938 are provided in the color adjusting UI 930.

When the color adjusting UI 930 is displayed, the user looks at the image that the printer 1 formed on the paper P at the process in S47 and then presses the OK button 937 if the image is appropriate. In contrast, if the user looks at the image and intends to reprint the image after adjusting the color adjusting parameter, the user presses the reprinting button 936. Also, if the user intends to end the process not to adjust the color adjusting parameter, the user presses the cancel button 938. Therefore, when the color adjusting UI 930 is displayed in S51, as shown in FIG. 8, the color adjusted flag of the print setting in the flag table in FIG. 7 is set to “false” in S52. Here, an initial value of the color adjusted flag of each print setting is “false”. Then, in S53 to S55, the standby process is executed by a loop process until any one of the reprinting button 936, the OK button 937 and the cancel button 938 is pressed.

When the reprinting button 936 is pressed during the loop process in S53 to S55 (S53: Y), the process proceeds to S56. In S56, the color adjusted result obtained by the color adjusting UI 930 at that time is reflected temporarily in the print setting. That is, the color adjusting parameter displayed in the color adjusting UI 930 is written into the parameter table to be reflected in the process in S45. Then, in S57, the image data saved in S43 are read, and the process proceeds to above S45. Then, the image corresponding to the color adjusting parameter adjusted by the color adjusting UI 930 is formed by the processes in S45 to S47. Then, the process again proceeds to the loop process in S53 to S55 via the above steps. The color adjusting UI 930 may be displayed even after the reprinting button 936 and continued to display at S51. Instead, displaying the color adjusting UI 930 may be stopped when the reprinting button 936 and then displayed again at S51. Still further, displaying the color adjusting UI 930 may be stopped when the reprinting button 936 and then displayed again at S51 only if a predetermined input such as an instruction of redisplay is received. In case where displaying the color adjusting UI 930 is stopped, when the color adjusting UI 930 is displayed again, the color adjusting UI 930 is displayed based on the color parameters having been adjusted.

Also, when the OK button 937 is pressed during the loop process in S53 to S55 (S54: Y), the process proceeds to S58. In S58, the color adjusted result obtained by the color adjusting UI 930 at that time is saved formally in the parameter table. Then, in S59, the color adjusted flag of the print setting in the flag table is set to “truth.” Then, in S60, a present time is written into the color adjusted time of the print setting in the flag table. Then, the process is ended. The color adjusting UI 930 also disappears from the display 820 in response to the end of this process.

Also, when the cancel button 938 is pressed during the loop process in S53 to S55 (S55: Y), the process is ended. The color adjusting UI 930 also disappears from the display 820. In this case, even if the color adjusting parameter is rewritten temporarily in S56, such rewriting is canceled and the color adjusting parameter given before the start of the present process is maintained.

Returning to FIG. 4, if the color adjusting mode of the print setting read in S1 is not set to “forced ON” (S2: N), the CPU 811 determines whether the color adjusting mode of the print setting is set to “forced OFF”, i.e., “not perform color adjustment” in S5. If the color adjusting mode is set to “forced OFF” (S5:Y), the color adjustment executing flag is set to “false” in S6. Then, the printing process (S4) is executed.

In the printing process of S4, the processes of S51 to S60 are not performed since the color adjusting mode indicates “false.” Therefore, the color adjustment made by the color adjusting UI 930 is not executed, and the image formation (S45 to S47) is executed by using the color adjusting parameters being set at that time point. Then, the process is ended.

Also, if the color adjusting mode of this print setting is set to neither “forced ON” nor “forced OFF” (S2: N, S5: N), i.e., if the color adjusting mode is set to “perform color adjustment as needed,” the process proceeds to S9. Then, in S9, the CPU 811 determines whether the color adjusted flag is set to “false.” Then, if the color adjusted flag is set to “false” (S9:Y), the process proceeds to S3. That is, if the color adjustment by the processes in S53 to S56 and the save of this color adjusted result (S58) are not applied to the print setting, the color adjusting processes in S51 to S60 are executed during the printing process in S4, as described above.

If the color adjusted flag of the print setting is set to “truth” (S9: N), the CPU 811 determines whether the adjusting interval written into the flag table has elapsed from the color adjusting time of the print setting in the flag table at a present time in S10. Then, if the adjusting interval has elapsed from the color adjusting time (S10: Y), the process proceeds to above S3. That is, the time-dependent change occurs in various characteristics of the printer engine 200 including a charged polarity and a fluidity of the toner. Therefore, if the previously set adjusting interval has elapsed from the preceding color adjusting process (S51 to S60) (S10: Y), the color adjusting process (S51 to S60) is executed again during the printing process in S4.

If the adjusting interval has not elapsed from the color adjusting time of the print setting (S10: N), a process replacement time is acquired from the printer 1 in S11. When any one of the IC tag readers 320Y to 320K senses the IC tag 310 that stores a new serial number, the control unit 10 of the printer 1 stores time as the process replacement time at which the developing unit 51 has been replaced. Therefore, in S11, the process replacement time is acquired by the communication with the control unit 10. Then, in S12, the CPU 811 determines whether the process replacement time is later than the color adjusting time of the print setting. Then, if the process replacement time is later than the color adjusting time (S12: Y), the process proceeds to S3. That is, sometimes the toner characteristics, etc. are changed when the developing unit 51 is replaced. If the developing unit 51 has been replaced after the preceding color adjusting process (S51 to S60) (S12: Y), the color adjusting process (S51 to S60) is executed again during the printing process in S4.

If the process replacement time is earlier than the color adjusting time of the print setting (S12: N), the process proceeds to S6. In other words, since there is no need to execute the color adjusting process (S51 to S60) once again in this case, the color adjusting UI 930 is never displayed and the image formation (S45 to S47) is executed by using the color adjusting parameters being set at that time point.

Accordingly, in this embodiment, if the color adjusting mode is set to “perform color adjustment as need” (S5: N), the color adjusting UI 930 is automatically displayed (S51) when the print setting in which the color adjusting process (S51 to S60) has not been executed is read (S9: Y), when the color adjustment is required due to the time dependent change, or the like (S10:Y), or when the color adjustment is required due to the replacement of the developing unit 51 (S12:Y). Therefore, the operability of the color adjusting UI 930 can be improved, and adjustment of the color adjusting parameter (S51 to S60) can be made effectively at an appropriate timing.

In addition, the adjusting interval can be set in response to the time dependent change for every print setting. Therefore, even though a period during which readjustment of the color adjusting parameter is not needed (the above adjusting interval) becomes different in every print setting, the color adjusting UI 930 is displayed automatically at an appropriate timing in response to such difference, and thus the color adjusting parameter can be adjusted more effectively. For example, even when the color toner and the black toner respectively have the different time dependent characteristics, the adjusting interval can be set differently in the color mode and the monochromatic mode.

In the color adjusting UI 930, the image formation (S45 to S47) and the color adjustment (S51 to S56) can be executed repeatedly any number of times by pressing the reprinting button 936. Also, the color adjusting UI 930 disappears by pressing the OK button 937. As a result, the operability can be improved much more.

The present invention is not limited to the above embodiment at all, and the present invention can be carried out in various modes in a scope not departing from a scope of the invention. For example, the processes on the PC 800 explained in FIG. 4 to FIG. 10 may be performed at the printer 1 by providing the display appropriately to the printer 1. In this case, the image data (see S41) as the source of the print data may be transmitted from the PC 800, or may be supplied by the removable disk such as the USB memory, etc. directly inserted into the printer 1, i.e., the so-called direct print.

Also, the image forming apparatus of the present invention is not limited to the color image forming apparatus described above, and may be applied to the monochromatic image forming apparatus. In this case, the parameter used to control the gradient in neutral color such as the gamma correction, or the like can be considered as the color adjusting parameter. In addition, the image forming apparatus of the present invention may be applied to the apparatus such as the ink jet printer, or the like, which forms the image by the method except the electrophotographic system. In the case of the ink jet printer, replacement of the ink cartridge corresponds to replacement of the replaceable unit.

Also, the computer readable medium of the present invention is not limited to the hard disk drive, and may be any medium such as a memory device such as ROM, a flexible disk, a compact disk, a web server on the Internet, etc. Further, the software program stored in the computer readable medium may be executed by computer such as the personal computer as the host apparatus, the microcomputer for controlling the image forming apparatus, etc.

What is claimed is:

1. An image forming apparatus comprising:

an image data correcting unit configured to correct image data based on color conversion information;

an image forming unit that forms an image corresponding to the corrected image data on a recording medium;

a setting designating unit configured to designate one of a plurality of setting modes contained in setting information to form the image;

a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition, wherein the setting information includes a plurality of setting items each containing a plurality of modes that can be designated, wherein the setting mode is defined by a combination of the setting items, wherein the setting items include a color mode, an image quality mode and a media type, wherein the color conversion information storing unit stores adjusted information for each of the setting modes, the adjusted information indicating whether the color conversion information has been adjusted, and wherein the adjusting screen display unit displays the adjusting screen if the color conversion information corresponding to the designated setting mode has not been adjusted.

2. The image forming apparatus according to claim 1, wherein the adjusting screen displaying unit displays the adjusting screen after the image forming unit forms the image based on the designated setting mode.

3. The image forming apparatus according to claim 1, wherein if the adjusting screen is displayed and then an instruction to form an image based on color conversion information adjusted by using the adjusting screen is received, the adjusting screen displaying unit continues to display the adjusting screen.

4. The image forming apparatus according to claim 1, wherein the image forming unit includes a replaceable unit, wherein the adjusting screen displaying unit displays the adjusting screen in case where the replaceable unit is replaced.

5. The image forming apparatus according to claim 4, further comprising:

a replacement detecting unit that detects a replacement of the replaceable unit; and a replaced time storing unit that stores a replaced time indicating when the replacement detecting unit detects the replacement of the replaceable unit, wherein the color conversion information storing unit stores adjusted time information for each of the setting modes, the adjusted time information including adjusted time indicating when the color conversion information has been adjusted, and wherein the adjusting screen displaying unit displays the adjusting screen if the adjusted time corresponding to the designated setting mode is before the replaced time.

6. An image forming apparatus comprising:

an image data correcting unit configured to correct image data based on color conversion information;

an image forming unit that forms an image corresponding to the corrected image data on a recording medium;

a setting designating unit configured to designate one of a plurality of the setting modes contained in setting information to form the image;

a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition, wherein if the adjusting screen is displayed and then an instruction to form an image based on color conversion information adjusted by using the adjusting screen is received, the adjusting screen displaying unit stops displaying the adjusting screen, and wherein after the image forming unit forms the image based on the adjusted color conversion information, the adjusting screen displaying unit displays the adjusting screen again.

7. The image forming apparatus according to claim 6, wherein the setting information includes a plurality of setting items each containing a plurality of modes that can be designated, and wherein the setting mode is defined by a combination of the setting items.

8. The image forming apparatus according to claim 7, wherein the setting items include a color mode, an image quality mode and a media type.

9. The image forming apparatus according to claim 6, wherein the adjusting screen displaying unit displays the adjusting screen based on the adjusted color conversion information when displaying again.

10. The image forming apparatus according to claim 6, wherein, when a predetermined operation is applied to the adjusting screen, the adjusting screen displaying unit displays the adjusting screen again.

11. An image forming apparatus comprising:

an image data correcting unit configured to correct image data based on color conversion information;

an image forming unit that forms an image corresponding to the corrected image data on a recording medium;

a setting designating unit configured to designate one of a plurality of the setting modes contained in setting information to form the image;

a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition, wherein the color conversion information storing unit stores adjusted time information for each of the setting modes, the adjusted time information including adjusted time indicating when the color conversion information has been adjusted, and wherein the adjusting screen displaying unit displays the adjusting screen if a predetermined time or more has elapsed from the adjusted time corresponding to the designated setting mode.

12. The image forming apparatus according to claim 11, wherein the adjusting screen display unit displays the adjusting screen if the color conversion information corresponding to the designated setting mode has not been adjusted.

13. The image forming apparatus according to claim 11, wherein the predetermined time is settable for each of the setting modes.

14. A host apparatus connectable to communicate with an image forming apparatus that includes an image forming unit that forms an image on a recording medium, the host apparatus comprising:

an image data correcting unit configured to correct image data based on color conversion information to allow the image forming unit to form an image corresponding to the corrected image data;

a setting designating unit configured to designate one of a plurality of setting modes contained in setting information to form the image;

a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition, wherein the setting information includes a plurality of setting items each containing a plurality of modes that can be designated, wherein the setting mode is defined by a combination of the setting items, wherein the setting items include a color mode, an image quality mode and a media type, wherein the color conversion information storing unit stores adjusted information for each of the setting modes, the adjusted information indicating whether the color conversion information has been adjusted, and wherein the adjusting screen display unit displays the adjusting screen if the color conversion information corresponding to the designated setting mode has not been adjusted.

15. A computer readable medium storing a software program to control an image forming apparatus that includes an image forming unit that forms an image on a recording medium, the software program enabling a computer to function as:

an image data correcting unit configured to correct image data based on color conversion information to allow the image forming unit to form an image corresponding to the corrected image data;

a setting designating unit configured to designate one of a plurality of setting modes contained in setting information to form the image;

a color conversion information storing unit that stores the color conversion information for each of the setting modes; and an adjusting screen displaying unit configured to display an adjusting screen on a display screen, which is used for adjusting the color conversion information applied to form the image, if the color conversion information corresponding to the designated setting mode is in a predetermined condition, wherein the setting information includes a plurality of setting items each containing a plurality of modes that can be designated, wherein the setting mode is defined by a combination of the setting items, wherein the setting items include a color mode, an image quality mode and a media type, wherein the color conversion information storing unit stores adjusted information for each of the setting modes, the adjusted information indicating whether the color conversion information has been adjusted, and wherein the adjusting screen display unit displays the adjusting screen if the color conversion information corresponding to the designated setting mode has not been adjusted.

* * * * *